(12) United States Patent
Goringe et al.

(10) Patent No.: US 7,571,239 B2
(45) Date of Patent: Aug. 4, 2009

(54) CREDENTIAL MANAGEMENT AND NETWORK QUERYING

(75) Inventors: Christopher M. Goringe, Seven Hills (AU); Muneyb Minhazuddin, Quakers Hill (AU); James D. Schreuder, Summer Hill (AU); Alex M. Krumm-Heller, Gladesville (AU); Alastair J. Rankine, Boulder, CO (US); Melanie L. Smith, Rozelle (AU)

(73) Assignee: Avaya Inc., Basking Ridge, NJ (US)

( * ) Notice: Subject to any disclaimer, the term of this patent is extended or adjusted under 35 U.S.C. 154(b) by 556 days.

(21) Appl. No.: 10/127,938

(22) Filed: Apr. 22, 2002

(65) Prior Publication Data

US 2003/0131096 A1  Jul. 10, 2003

Related U.S. Application Data

(60) Provisional application No. 60/347,060, filed on Jan. 8, 2002.

(51) Int. Cl.
*G06F 15/16* (2006.01)
(52) U.S. Cl. .............................. 709/229; 709/203; 726/5
(58) Field of Classification Search ......... 709/202–205, 709/217–225; 726/3–15
See application file for complete search history.

(56) References Cited

U.S. PATENT DOCUMENTS

| | | | |
|---|---|---|---|
| 4,556,972 A | 12/1985 | Chan et al. | |
| 4,644,532 A | 2/1987 | George et al. | 370/94 |
| 5,136,690 A | 8/1992 | Becker et al. | 395/161 |
| 5,185,860 A * | 2/1993 | Wu | 709/224 |
| 5,226,120 A | 7/1993 | Brown et al. | 395/200 |
| 5,450,408 A | 9/1995 | Phaal | 370/85.13 |
| 5,557,745 A | 9/1996 | Perlman et al. | 395/200.02 |
| 5,564,048 A | 10/1996 | Eick et al. | 395/600 |
| 5,572,650 A | 11/1996 | Antis et al. | 395/356 |
| 5,581,797 A | 12/1996 | Baker et al. | 395/326 |
| 5,596,703 A | 1/1997 | Eick et al. | 395/326 |
| 5,623,590 A | 4/1997 | Becker et al. | 395/326 |

(Continued)

FOREIGN PATENT DOCUMENTS

EP   0 455 402   11/1991

(Continued)

OTHER PUBLICATIONS

Improving System Security via Proactive Password Checking, M Bishop, DV Klein—Computers & Security—asociacion-aecsi.es, 1995.*

(Continued)

*Primary Examiner*—Yasin M Barqadle
(74) *Attorney, Agent, or Firm*—Sheridan Ross P.C.

(57) ABSTRACT

The present invention is directed to a system and method for determining one or more credentials of a network device. The system and method select a first network device from among a plurality of network devices, access a credential repository, contact the first network device, and test the validity of the first set of credentials. The credential repository comprises a first set of credentials corresponding to the first network device. If a user provides invalid or no credentials, a candidate credential queue can be used to guess a valid second set of credentials when the first set of credentials is not valid.

38 Claims, 3 Drawing Sheets

U.S. PATENT DOCUMENTS

| | | | |
|---|---|---|---|
| 5,636,350 | A | 6/1997 | Eick et al. .................... 395/356 |
| 5,644,692 | A | 7/1997 | Eick .......................... 395/326 |
| 5,734,824 | A | 3/1998 | Choi ..................... 395/200.11 |
| 5,737,526 | A | 4/1998 | Periasamy et al. |
| 5,751,971 | A | 5/1998 | Dobbins et al. |
| 5,805,593 | A | 9/1998 | Busche ....................... 370/396 |
| 5,812,763 | A * | 9/1998 | Teng ........................... 726/25 |
| 5,850,397 | A | 12/1998 | Raab et al. .................. 370/392 |
| 5,881,051 | A | 3/1999 | Arrowood et al. |
| 5,881,246 | A | 3/1999 | Crawley et al. ........ 395/200.68 |
| 5,926,463 | A | 7/1999 | Ahearn et al. |
| 5,943,317 | A | 8/1999 | Brabson et al. ............. 370/238 |
| 5,966,513 | A | 10/1999 | Horikawa et al. ...... 370/200.53 |
| 6,047,330 | A | 4/2000 | Stracke, Jr. |
| 6,088,451 | A * | 7/2000 | He et al. ..................... 713/201 |
| 6,108,702 | A | 8/2000 | Wood |
| 6,119,171 | A | 9/2000 | Alkhatib |
| 6,122,639 | A | 9/2000 | Babu et al. |
| 6,131,117 | A | 10/2000 | Clark et al. |
| 6,249,820 | B1 | 6/2001 | Dobbins et al. |
| 6,252,856 | B1 | 6/2001 | Zhang |
| 6,256,675 | B1 | 7/2001 | Rabinovich ................. 709/241 |
| 6,269,398 | B1 | 7/2001 | Leong et al. |
| 6,269,400 | B1 | 7/2001 | Douglas et al. |
| 6,275,492 | B1 | 8/2001 | Zhang |
| 6,282,404 | B1 * | 8/2001 | Linton ........................ 434/350 |
| 6,298,381 | B1 | 10/2001 | Shah et al. |
| 6,360,255 | B1 | 3/2002 | McCormack et al. ....... 709/221 |
| 6,377,987 | B1 | 4/2002 | Kracht |
| 6,405,248 | B1 | 6/2002 | Wood ......................... 709/223 |
| 6,418,476 | B1 | 7/2002 | Luciani |
| 6,430,612 | B1 | 8/2002 | Iizuka ........................ 709/223 |
| 6,442,144 | B1 | 8/2002 | Hansen et al. |
| 6,446,121 | B1 | 9/2002 | Shah et al. |
| 6,456,306 | B1 | 9/2002 | Chin et al. .................. 345/810 |
| 6,550,012 | B1 * | 4/2003 | Villa et al. ..................... 726/11 |
| 6,744,739 | B2 | 6/2004 | Martin |
| 6,747,957 | B1 * | 6/2004 | Pithawala et al. ........... 370/252 |
| 6,859,878 | B1 * | 2/2005 | Kerr et al. ................... 713/183 |
| 6,871,284 | B2 * | 3/2005 | Cooper et al. ................... 726/1 |
| 6,895,436 | B1 * | 5/2005 | Caillau et al. ............... 709/224 |
| 6,952,779 | B1 * | 10/2005 | Cohen et al. ................... 726/22 |
| 7,069,343 | B2 | 6/2006 | Goringe et al. |
| 7,131,140 | B1 | 10/2006 | O'Rourke et al. |
| 7,133,929 | B1 | 11/2006 | Shah |
| 7,143,184 | B1 | 11/2006 | Shah et al. |
| 7,185,100 | B2 | 2/2007 | Shah |
| 7,200,673 | B1 | 4/2007 | Augart |
| 7,302,700 | B2 | 11/2007 | Mao et al. |
| 2001/0034837 | A1 * | 10/2001 | Kausik et al. ............... 713/185 |
| 2001/0049786 | A1 * | 12/2001 | Harrison et al. ............. 713/156 |
| 2002/0087704 | A1 * | 7/2002 | Chesnais et al. ............ 709/228 |
| 2002/0112062 | A1 * | 8/2002 | Brown et al. ................ 709/229 |
| 2002/0116647 | A1 * | 8/2002 | Mont et al. .................. 713/201 |
| 2002/0128885 | A1 * | 9/2002 | Evans .............................. 705/7 |
| 2002/0141593 | A1 * | 10/2002 | Kurn et al. ................... 380/286 |
| 2002/0144149 | A1 * | 10/2002 | Hanna et al. ................ 713/201 |
| 2002/0161591 | A1 * | 10/2002 | Danneels et al. ............... 705/1 |
| 2002/0188708 | A1 * | 12/2002 | Takahashi et al. ........... 709/223 |
| 2003/0004840 | A1 * | 1/2003 | Gharavy ...................... 705/30 |
| 2003/0043820 | A1 | 3/2003 | Goringe et al. |
| 2003/0065626 | A1 * | 4/2003 | Allen ........................... 705/76 |
| 2003/0065940 | A1 * | 4/2003 | Brezak et al. ............... 713/201 |
| 2003/0084176 | A1 * | 5/2003 | Tewari et al. ............... 709/230 |
| 2003/0163686 | A1 * | 8/2003 | Ward et al. .................. 713/156 |
| 2005/0071469 | A1 | 3/2005 | McCollom et al. |

FOREIGN PATENT DOCUMENTS

| | | |
|---|---|---|
| EP | 455402 A2 * | 11/1991 |
| JP | H01-315833 | 12/1989 |
| JP | 7-334445 | 12/1995 |
| JP | H11-085701 | 3/1999 |
| JP | 11-340995 | 12/1999 |
| JP | 2000-32132 | 1/2000 |
| JP | 2000-082043 | 3/2000 |
| JP | 2000-101631 | 4/2000 |
| JP | 2000-83057 | 9/2000 |
| JP | 2001-94560 | 4/2001 |
| JP | 2001-144761 | 5/2001 |
| JP | 2001-514409 | 9/2001 |
| WO | WO 98/18306 | 5/1998 |
| WO | WO 99/10793 | 3/1999 |

OTHER PUBLICATIONS

Request For Comments (RFC) 1067—A Simple Network Management Protocol, J Case, M Fedor, M Schoffstall, J Davin.*

John the Ripper v1.3, printed from the Dec. 25, 2001 web archive of "http://web.textfiles.com/computers/john.txt".*

Novotney, J et al. "An Online Credential Repository for the Grid: MYProxy" from High Performance Distributed Computing, 2001 Proceedings. Lawrence Berkely Lab. CA USA pp. 104-111 Aug. 7-9, 2001. see pp. 107-110 sections 4-6.*

Y. Breitbart et al., "Topology Discovery in Heterogeneous IP Networks," Proceedings of IEEE Infocom 2000 (Mar. 2000), 10 pages.

B. Huffaker et al., "Topology Discovery by Active Probing," CAIDA (2002), 8 pages.

M.R. Meiss et al., "Standards-Based Discovery of Switched Ethernet Topology," Advanced Network Management Lab, (Apr. 2002), pp. 1-20.

R. Siamwalla et al., "Discovering Internet Topology," Cornell University (Jul. 1998), pp. 1-16.

Jason Novotny et al., "An Online Credential Repository for the Grid: MyProxy" from High Performance Distributed Computing, 2001 Proceedings. Berkely, CA (Aug. 2001), pp. 104-111.

Moy, J., Network Working Group, OSPF Version 2, Mar. 1994, pp. 62, 68-76, 85.

PCT Written Opinion for Intl. App. No. PCT/US02/28467.

Official Action for Canadian Patent Application No. 2,468,841, mailed Oct. 31, 2007.

Moy, J., OSPF Version 2 Memorandum to Network Working Group, Mar. 1994, 2 pages.

NET-SNMP, The NET-SNMP Project Home Page, Dec. 13, 2000, 5 pages, http://net-snmp.sourceforge.net.

Network Working Group, Management Information Base for Network Management of TCP/IP-based Internets: MIB-II, Mar. 1991, 62 pages, http://www.ietf.org/rfc/rfc1213.txt.

Network Working Group, OSPF Version 2 Management Information Base, Nov. 1995, 71 pages, http://www.ietf.org/rfc/rfc1850.txt.

Network Working Group, OSPF Version 2, Apr. 1998, 191 pages, http://www.ietf.org/rfc/rfc2328.txt.

Network Working Group, RIP Version 2, Nov. 1998, 35 pages, http://www.ierf.org/rfc/rfc2453.txt.

Network Working Group, The OSPF NSSA Option, Mar. 1994, 15 pages, http://www.ietf.org/rfc/rfc1587.txt.

OpenSSL, The Open Source Toolkit for SSL/TLS, Apr. 17, 2002, 2 pages, http://www.openssl.org.

Packet Design CNS, "Route Explorer™ Simplifying Route Analysis", undated, 4 pages.

Packet Design, Inc., "Route Explorer™—Reports, Alerts, and Queries", undated, 2 pages.

International Search Report for International Application No. PCT/US02/30630 mailed Jan. 3, 2003.

"Computer & Network LAN" vol. 18, No. 1, pp. 47-57 (Relevance described in Japanese Patent Office's First Office Action for Japanese Patent App. No. 2003/527620 mailed Sep. 11, 2006).

National Technical Report (including translated abstract), Vo. 39, No. 1, pp. 63-71.

Japanese Patent Office's First Office Action for Japanese Patent App. No. 2003/527620 mailed Sep. 11, 2006.

Official Action for Canadian Patent Application No. 2,468,841, mailed Jan. 9, 2009.

Examiner's Office Letter (including translation) for Japanese Patent Application No. 2003-560770, mailed Dec. 1, 2008 (4366-60-PJP).

* cited by examiner

CREDENTIAL MANAGEMENT AND NETWORK QUERYING

CROSS REFERENCE TO RELATED APPLICATIONS

The present application claims priority under 35 U.S.C.§119 to U.S. Provisional Application Ser. No. 60/347,060, of the same title and filed Jan. 8, 2002, to Goringe, et al., which is incorporated herein by this reference.

FIELD OF THE INVENTION

The present invention is related generally to authentication in data networks and specifically to determining credentials for computational components in data networks.

BACKGROUND OF THE INVENTION

In computational networks, it is common to have one or more automated network management system (NMS) devices for collecting data to ascertain levels of performance (e.g., BER, loss of synchronization, etc.), equipment, module, subassembly, and card failures, circuit outages, levels of traffic, and network usage. NMS devices typically interrogate network components, such as routers, ethernet switches, and other hosts for stored information. As will be appreciated, a network device or component is a computational component that may or may not have a physical counterpart, e.g., the component may be a virtual computational component such as an interface. Examples of proprietary network management systems include Hewlett-Packard's OPENVIEW™, IBM's NETVIEW™, and Digital Equipment Corporation's EMA™. To permit such network management systems in distributed processing networks to communicate with hosts for monitoring and controlling the enterprise network, network management communication protocols have been developed, such as the Simple Network Management Protocol or SNMP and the Common Management Information Protocol or CMIP.

During interrogation, NMS devices interact with authentication systems present in network devices, such as routers. Authentication systems are an essential part of network security. Typically, a user is able to access information in certain network devices only by entering one or more credentials. As used herein, a "credential" refers to a set of information (e.g., a character or string of characters) which must be provided to a computational component for access to information in the computational component to be provided. Examples of credentials for version 1 of SNMP include a community string, for version 3 of SNMP User-Based/Security Model or include USM mode, user name, authentication method, authentication password, privacy method, and privacy password, and for TELNET include a user login, password, router type, and prompt. As will be appreciated, different credentials can be required for differing levels of information access, e.g. read-only access and supervisor levels.

When a new NMS system device is connected to a network, the NMS device must learn the various forms of authentication used to be able to interrogate network devices. The learning process typically involves a user manually setting credentials before using the tool on the network. This is not only a slow task but also fails to easily allow for dynamic changes of authentication during use. For example, some network security schemes require a credential to be periodically changed to maintain a high level of network security.

Network management personnel typically compromise network security for ease of credential configuration in NMS devices. For example, some network management systems rely on the credential being set to a default credential (generally public level access credentials) on all components in the network. In some applications, the varying access levels to the network components are compromised by using a common default credential. This practice unnecessarily restricts the type of authentication to a type of default credential and can restrict with what type of equipment the network management system can be used and also compromises network security. Other network management systems do permit a limited number of passwords to be entered before the network management system performs interrogation but fail to allow for dynamic changes in authentication during use.

SUMMARY OF THE INVENTION

These and other needs are addressed by the various embodiments and configurations of the present invention. The credential discovery agent of the present invention determines credentials of network devices by maintaining a credential repository, which typically is a historical record of credentials used in the network, and/or a candidate credential queue, which typically is a listing of credentials ordered based on the likelihood that the credentials are in current use by the network devices of interest. In one architecture, the agent, repository, and queue consider that network management personnel reuse credentials over time and, at any given time, reuse the same credential for different network devices.

In one embodiment, the credential discovery agent determines one or more credentials of a network device by performing the steps of:

(a) selecting a first network device from among a plurality of network devices;

(b) accessing the credential repository, the credential repository comprising a first set of credentials corresponding to the first network device;

(c) contacting the first network device; and (d) testing the validity of the first set of credentials.

The credential repository holds credentials that have been learned (e.g., from the user, by a successful guess, etc.). The repository is used to save the credentials between executions and can have things removed or added to it during agent operation. Between runs the repository allows the credentials to be stored so they can be used on subsequent runs of the agent.

The credential repository can include a number of variables associated with the first network device. These variables can include a corresponding credential state, a corresponding protocol identifier, a corresponding (IP) address, a total number of instances of use of at least one credential in the first set of credentials, a corresponding candidate credential frequency counter associated with at least one credential in the first set of credentials, a recency of use of at least one credential in the first set of credentials, and the administrative locality of at least one credential in the first set of credentials. The protocol identifier is indicative of the protocol defining or associated with the credentials and/or the authentication system used to communicate with the network device.

If the agent is unable to determine the valid credentials using the repository, the agent can prompt the user for additional credentials to test. In this manner, the user can provide input into the operation of the agent. The user is typically prompted for credentials as the agent contacts differing types of network devices. The user fills in the required credential(s) and the agent then verifies that the inputted credential(s) are correct by using the inputted credential(s) to contact the network device. When the credential(s) is valid, it is copied into the repository.

In another embodiment, the agent determines at least one credential of a network device when previously used credentials are invalid or unsuccessfully validated by performing the steps of:

(a) selecting one or more credential from a candidate credential queue;

(b) contacting a network device;

(c) testing the validity of the credential(s); and (d) assigning a priority value or ranking to the tested credential based on whether or not the credential(s) is valid.

The priority value is used to determine an order in which to test corresponding credentials when it is necessary to guess the credential in use by the network device. In one configuration, the priority value is used to order the listing of credentials in the candidate credential queue. In another configuration, the priority value is determined based on one or more of a candidate credential frequency counter, a recency of use counter, and an administrative locality associated with the corresponding set of credentials.

In one configuration, the agent attempts to guess the credential before prompting the user for a credential. These guesses may include standard defaults, credentials which have been used or tried elsewhere in the network, or credentials which have been provided by the user up-front.

The agent, credential repository, and candidate credential queue can have a number of advantages. First, the agent can dynamically and automatically maintain the repository and candidate over time. Conventional tools allow for a limited number of credentials to be entered before the tool is used, but such tools do not allow for dynamically adding more credentials during use of the tool. In contrast, the agent updates the repository and queue during and/or after each run of the credential discovery agent. Second, the agent can be convenient to use and determine credentials in significantly less time than conventional techniques. Third, the agent can reduce the amount of user interaction by making educated guesses at the credential before prompting the user. In some configurations, the agent speculatively tests credentials on any new network devices detected to reduce the requirement for user interaction. Fourth, the agent can obviate the need for the user to manually input an extensive list of credentials before the agent is run. Fifth, the agent can make network management systems more flexible in dealing with unknown credentials by prompting the user and also storing known credentials in the repository for later use. These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
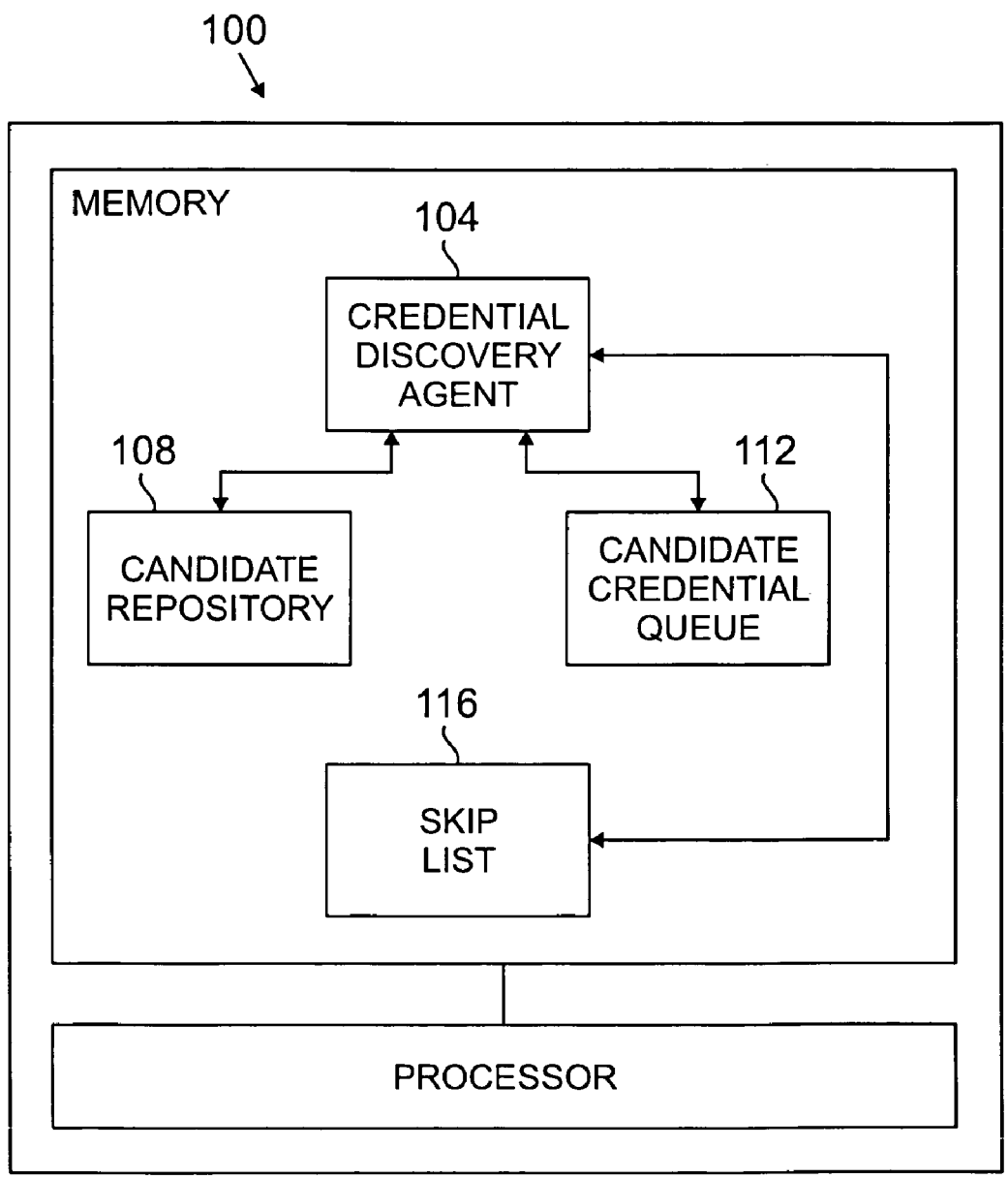
FIG. 1 is a block diagram of a computational architecture according to a first embodiment of the present invention and FIGS. 2A and 2B depict a flow schematic of the credential discovery agent.

FIG. 1 depicts a computational architecture 100 according to a first embodiment of the present invention. The architecture 100 comprises a credential discovery agent 104 configured to determine one or more valid credentials for selected network devices or components, a credential repository 108 mapping credentials to IP addresses and containing other information, a candidate credential queue 112 listing credentials in order of priority for credential guessing by the credential discovery agent 104, and a skip list 116 listing IP addresses for which credential determination was not performed at the request of the user.

The credential repository 108, which is typically encrypted, is loaded at runtime of the agent 104 to provide an initial population of credentials for IP addresses of network components. The repository can include a number of fields for each IP address including one or more credentials, a credential state, a protocol identifier, and protocol access level for credential and/or for each credential a protocol identifier, corresponding IP addresses, the total number of instances of use of the credential by the listed IP addresses, a priority of use of the credential, a candidate credential frequency counter to reflect the frequency of use of the credential in the network (or in the credential repository), recency of use of the (valid) credential in the network (or recency of use as determined by the agent 104), the administrative locality of the credential, and other information that can be used to assign a priority value to the credential in the candidate credential queue 112. During operation of the agent 104, the credential repository 108 is updated by the agent 104, such as after each IP address is considered and/or after all of the IP addresses are considered. As will be appreciated, a unique network component identifier other than IP address can be employed, depending upon the protocol associated with the network component.

The candidate credential queue 112 provides a listing of credentials, each of which has a corresponding priority and protocol identifier. When guessing, the agent 104 tests the credentials in order of each credential's corresponding priority value. In one implementation for version 1 of SNMP, the queue 112 is initially populated with a credential containing the community string "public". During any individual discovery task, each credential, which is successfully validated by the credential repository is also added to the queue 112, though with a lower priority than that of the "public" credential. As will be appreciated, the priority can be assigned based on any one of or combination of factors including the candidate credential frequency counter to reflect the frequency of use of the credential in the network (or in the credential repository), the recency of use of the (valid) credential in the network (or the recency of use as determined by the agent 104), and/or the administrative locality of the credential relative to the IP address under consideration (e.g., if the network component under consideration is associated with or connected to another network component which has a corresponding credential the corresponding credential is first used as a test credential).

The skip list 116 is simply a listing of network component IP addresses for which the agent 104 will not perform a credential determination.

Figure 2A:
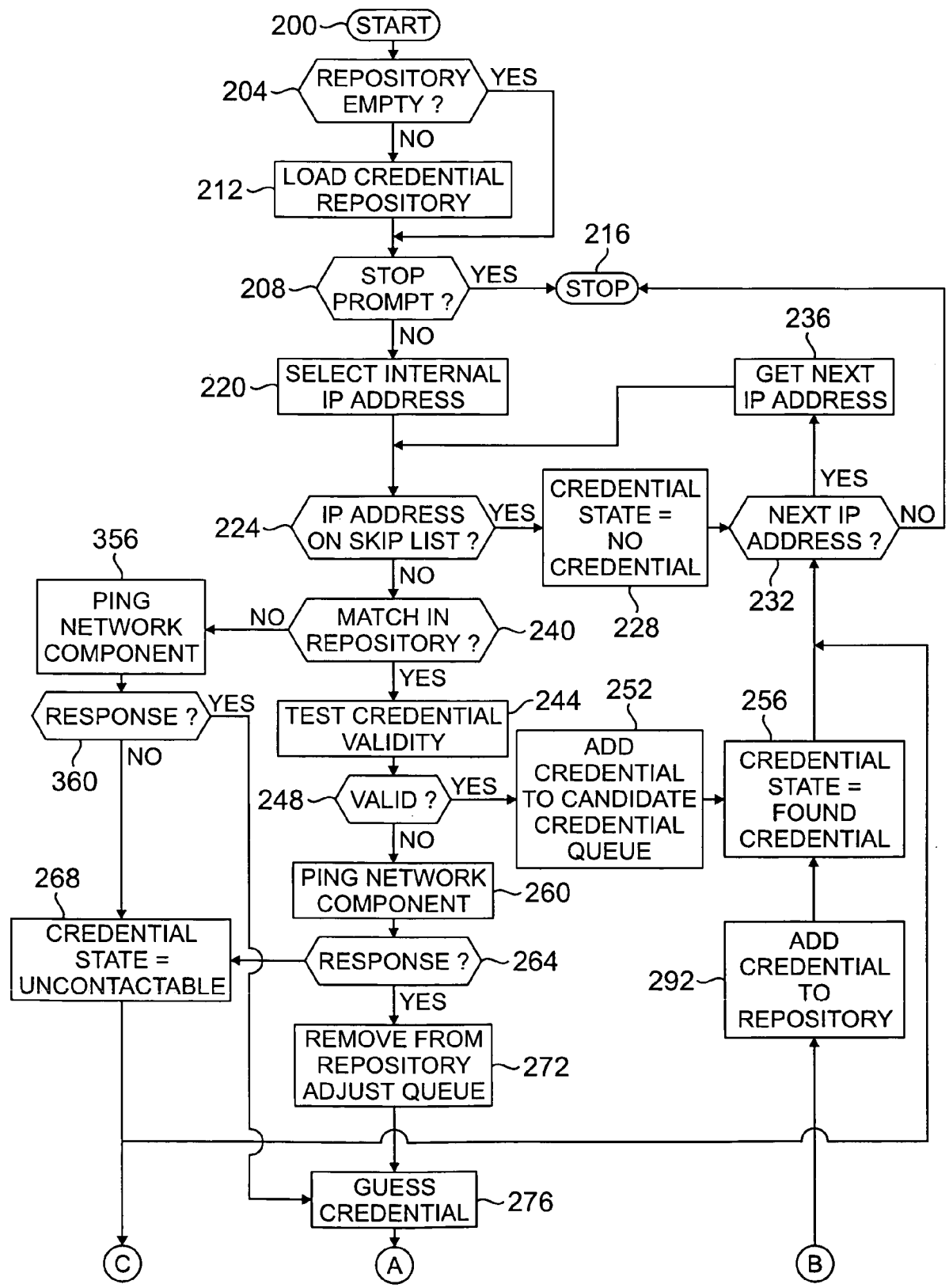
Figure 2B:
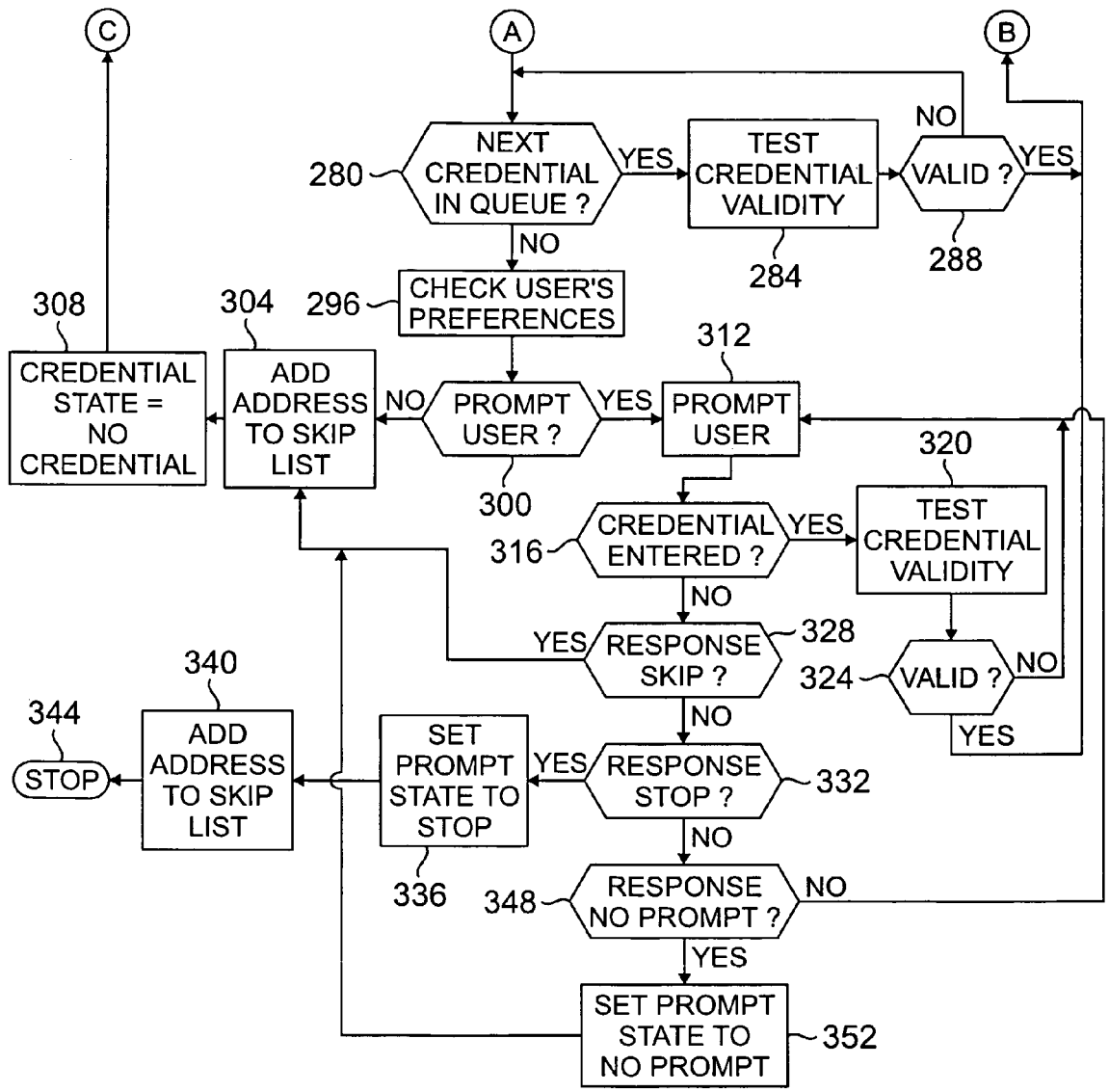

The operation of the credential discovery agent 104 is depicted in FIGS. 2A and 2B. Referring to FIG. 2A, the agent 104 is created in step 200.

In step 204, the agent 104 determines if the credential repository 108 is populated with one or more IP addresses. If the credential repository 108 is empty or nonexistent, the agent 104 initializes the repository and proceeds to step 208. If the credential repository is not empty, the repository is loaded by the agent in step 212. Initially, all credentials in the credential repository 108 are assumed to be untested or not yet successfully validated. The agent 104 then proceeds to step 208.

In decision diamond 208, the agent determines whether the user has requested to stop discovery. If the user has so requested, the agent 104 proceeds to step 216 and returns with an error code (STOP_CRED) indicating the request. If the user has not so requested, the agent proceeds to step 220.

In step 220, the agent selects an initial IP address for credential determination. The initial IP address is typically selected from a network access list of one or more IP addresses provided by the user. This network access list can be generated by the user manually or automatically using a network topology discovery algorithm such as described in U.S. patent applications entitled "Topology Discovery by Partitioning Multiple Discovery Techniques" and "Using Link State Information to Discover IP Network Topology", both by Goringe, et al., filed concurrently herewith and incorporated herein by this reference. The network access list typically includes a list of network component identifiers (e.g., IP addresses) and a corresponding credential state field for each identifier.

The agent then proceeds to step 224 where the agent determines if the selected IP address is on the skip list 116.

If the selected IP address is on the skip list 116, the agent 104 sets the credential state for the IP address in the network access list as NO CREDENTIAL in step 228 and proceeds to decision diamond 232 where the agent determines if there is another IP address on the network access list. The NO CREDENTIAL state means that no valid credential was obtained for the corresponding IP address. The corresponding IP address entry in the credential repository 108 (if any) is typically not removed from the repository if the IP address is skipped. If a next IP address is available, the agent 104 gets the next IP address in step 236 and repeats step 224. If a next IP address is unavailable, the agent 104 saves the updated credential repository and terminates operation in step 216.

If the IP address is not on the skip list, the agent 104 next determines in decision diamond 240 whether there is in the credential repository 108 an IP address entry matching the selected IP address. In other words, the agent 104 determines whether the repository 108 contains a credential corresponding to the selected IP address.

When a corresponding credential exists, the agent in step 244 tests the validity of the credential by known techniques. The techniques, of course, depend upon the protocol being used by the network component corresponding to the IP address.

When the credential is valid in step 248, the agent 104 proceeds to step 252 where the credential is added to the candidate credential queue 112 and then to step 256 where the corresponding entry in the network access list (and/or credential repository) is assigned the credential state of FOUND CREDENTIAL. This state means that the credential was validated. The credential is stored in the appropriate out-parameter corresponding to the IP address. The agent 104 may increment a candidate credential frequency counter and/or otherwise adjust the priority of the credential in the candidate credential queue 112. The agent 104 then returns to step 232 discussed above.

When the credential is invalid in step 248, the agent 104 must determine the reason why the credential was not successfully validated. The unsuccessful validation could be due to an invalid credential or to the network component being uncontactable at the time. Accordingly, the agent 104 in step 260 pings the device and in decision diamond 264 determines whether a response is received from the component within a selected time interval. The ping step 260 can be done using an Internet Control Message Protocol or ICMP echo request.

In any event, if a response is not received, the agent 104 in step 268 assigns a credential state of UNCONTACTABLE to the corresponding entry in the network access list (and/or credential repository) and returns to step 232 above. As will be appreciated, the credential state of UNCONTACTABLE indicates that the network component was unresponsive to the ping. The corresponding IP address entry in the credential repository is not removed when the credential state is UNCONTACTABLE.

If a response is received, the agent 104 in step 272 removes the entry corresponding to the IP address from the credential repository 108, updates the entry corresponding to the credential in the credential repository 108, and adjusts the candidate credential queue 112 when the credential is listed in the candidate credential queue. As noted, the priority of the credentials in the queue 112 can be based on any number of factors, including usage of the credential. When the credential is no longer in use by a network component, the priority often requires adjustment downward to reflect the nonuse. Typically, the candidate credential frequency counter is decremented.

The agent next proceeds to step 276 where the agent 104 attempts to guess the credential from the credentials listed in the queue 112. When guessing, the agent 104 tries all of the credentials in the queue 112 in order of priority. As shown in steps 280, 284, and 288, each credential is retrieved sequentially and an attempt is made to validate it.

When a credential is successfully validated in steps 276, 280, 284 and 288, the credential is stored in the appropriate out-parameter corresponding to the IP address in step 292 and the corresponding entry in the network access list (and/or credential repository) is assigned the credential state of FOUND CREDENTIAL in step 256. The agent 104 may increment a candidate credential frequency counter and/or otherwise adjust the priority of the credential in the candidate credential queue 112. The agent 104 then returns to step 232 which is discussed above.

When a credential is unsuccessfully validated in steps 276, 280, 284 and 288, the agent 104 in step 296 checks the user's preferences regarding whether or not the user is to be prompted for further instructions regarding the IP address. This preference is indicated by using a flag state. If no credentials that can be used to access the remote network component are found or if none of the found credentials work, the user may be prompted for a new set of credentials. The user is prompted only if the existence of the remote network component has earlier been confirmed by pinging as noted above and the flag to not prompt the user is not set (or vice versa).

In decision diamond 300, the agent 104 determines whether to prompt the user. When the prompt flag is set (i.e., the user does not want to be prompted) then the agent 104 in step 304 marks the IP address for which no credential can be found as through the user had responded with a skip command. In other words, the IP address is added to the skip list 116. The corresponding entry in the network access list (and/or credential repository) is then assigned in step 308 a credential state of NO CREDENTIAL. The agent 104 then returns to step 232 discussed above.

When the prompt flag is not set (i.e., the user wants to be prompted), then the agent 104 in step 312 prompts the user. The user can respond in five different ways. First, the user can respond by entering a credential as shown by decision diamond 316. When a credential is entered, the agent 104 tests the validity of the credential in step 320. When in step 324 the credential is valid, the agent proceeds to step 292 discussed above. When in step 324 the credential is invalid, the agent returns to step 312 and again prompts the user. Second, the user can respond by instructing the agent 104 to skip the IP address. This is shown in step 328. When the agent 104 receives this response, the agent 104 proceeds to step 304 discussed previously. Third, the user can respond by instructing the agent 104 to stop. This is shown in step 332. In that event, the agent 104 sets the prompt flag to stop in step 336, adds the address to the skip list 116 in step 340, saves the updated credential table and terminates operation in step 344. Fourth, the user can respond by instructing the agent 104 to no prompt. This is shown by step 348. In that event, the agent 104 sets the prompt flag to no prompt in step 352 and proceeds to step 304 discussed above. Finally, the user can provide an unintelligible or unrecognized response. In that event, the agent 104 returns to step 312 and again prompts the user.

Returning to decision diamond 240, when a corresponding credential is not in the credential repository the agent 104 in step 356 pings the device as discussed above to determine if the network component is contactable. The agent 104 in decision diamond 360 determines whether or not a response is timely received. When a timely response is received, the agent 104 proceeds to step 276 discussed above. When no timely response is received, the agent 104 proceeds to step 268 also discussed above.

A number of variations and modifications of the invention can be used. It would be possible to provide for some features of the invention without providing others. For example in one alternative embodiment, the architecture discussed above supports other versions of SNMP, such as version 3 of SNMP, and/or protocols other than SNMP, such as TELNET and CMIP. In this embodiment, the credential object would be defined in way(s) to support one or more different protocols. For example, the architecture can support multiple protocols at the same time. A protocol identifier is then used in the credential repository to identify the protocol corresponding to the network component and the credential object accorded a number of alternative definitions depending upon the corresponding protocol. In this embodiment, the credentials in the candidate credential frequency queue 112 would only be used in the credential guessing routine for the network component corresponding to the IP address under consideration when the network component used the protocol corresponding to the credential (as shown by the corresponding protocol identifier). In another alternative embodiment, a unique network component identifier other than IP address is used in the credential repository. For example, the identifier could be a component id as defined by the OSPF protocol, and/or credentials preconfigured by the user to be used as candidates for guessing. In another alternative embodiment, credentials in the repository that are not successfully validated are not removed from the respository but are marked with an appropriate flag indicating this fact. The credential may still be used by the network at a subsequent time or be concurrently used by a network component that is not listed in the credential repository. These credentials are eligible for inclusion in the candidate credential queue 112. As will be appreciated, some network security schemes rotate use of or periodically reuse credentials. In yet another alternative embodiment, the candidate credential queue can include credentials from sources other than the network itself. For example, the queue can include credentials that are in common or widespread use in the industry, default credentials in use when a device is initially acquired from a supplier or manufacturer, and/or credentials that are provided by the user in advance.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

In one alternative embodiment, the credential discovery agent is implemented in whole or part as an application specific integrated circuit or other type of logic circuit.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for determining one or more credentials of a network device, comprising:

selecting, for valid credential discovery, at least one of a first network device and an electronic address of the first network device from among a plurality of network devices and/or corresponding electronic addresses in a network;

accessing a credential repository, the credential repository comprising a collection of electronic addresses corresponding to the network devices and, for each electronic address, a respective set of credentials previously used at the corresponding electronic address to evidence privileges for a network device associated with the corresponding electronic address, and a candidate credential queue, the candidate credential queue comprising a collection of candidate credentials, each candidate credential having a corresponding at least one of a priority and protocol identifier, the priority indicating a likelihood that the corresponding credential is in current use by the first network device and the protocol identifier indicating a protocol compatible with the corresponding credential, wherein the credentials comprise at least one of a community string, User-Based Security Model (USM) mode, authentication method, authentication password, privacy method, and privacy password;

contacting the first network device;

accessing, from the credential repository, a first set of credentials corresponding to a first electronic address of the first network device;

testing the validity of each member of the first set of credentials in the credential repository with the first network device;

when no credential in the first set of credentials is valid for use with the first network device, testing the validity of selected credentials in the candidate credential queue with the first network device; and when a credentials is valid for use with the first network device, recording the credential as being valid for the first network device.

2. The method of claim 1, wherein the at least one of a priority and protocol identifier is priority value.

3. The method of claim 2, wherein the priority value is based on at least one of the following: a candidate credential frequency counter indicating a number of instances of use, by the plurality of network devices and over a selected time period, of a respective credential, a recency of valid use of the respective credential by the plurality of network devices, and a proximity, relative to the first network device, of an administrative locality of at least one of a network device and electronic address found to have validly used the respective credential to the first network device.

4. The method of claim 3, wherein the priority value is a function of a plurality of the candidate credential frequency counter, the recency of valid use of the respective credential and the proximity, relative to the first network device.

5. The method of claim 3, wherein the priority value is a function of the candidate credential frequency counter, the recency of valid use of the respective credential and the proximity, relative to the first network device.

6. The method of claim 1, wherein the credential repository comprises for at least one credential a plurality of a credential state, a protocol identifier indicating a protocol for which the respective credential is compatible, a protocol access level, a total number of instances of use of the respective credential by the plurality of network devices, a priority of use among the plurality of network devices of the respective credential, a candidate credential frequency counter to reflect a frequency of use of the credential among the plurality of network devices, a recency of use among the plurality of network devices of the respective credential, an administrative locality of the respective credential.

7. The method of claim 1, wherein the selected credentials are tested in an order based on priority value.

8. The method of claim 2, wherein the priority value is based on the candidate credential frequency counter.

9. The method of claim 2, wherein the priority value is based on the recency of valid use of the respective credential.

10. The method of claim 2, wherein the priority value is based on the proximity, relative to the first network device, of an administrative locality of at least one of a network device and electronic address found to have validly used the respective credential to the first network device.

11. The method of claim 1, further comprising, when at least one credential is valid for use with the first network device:
adding the valid credential to the candidate credential queue.

12. The method of claim 1, further comprising, when at least one credential is not valid:
pinging the first network device to determine whether the first network device is contactable;
when a response is received, removing the credential from the respective set of credentials in the credential repository corresponding to the at least one of the first network device and first electronic address; and
when a response is not received, assigning a state of NOT CONTACTABLE to a corresponding entry in the credential repository.

13. The method of claim 1, wherein the at least one of a priority and protocol identifier is protocol identifier.

14. The method of claim 13, further comprising:
comparing a protocol associated with the first network device with a protocol identifier associated with a first credential in the selected set of credentials in the candidate credential queue; and
when the protocol associated with the first network device is determined to be the same as the protocol associated with the protocol identifier, testing the selected credential for use with the first network device.

15. The method of claim 1, further comprising, when the selected set of credentials in the candidate credential queue is not valid for use with the first network device:
prompting a user for a candidate set of credentials; and
when the candidate set of credentials is received from the user, testing the validity of the candidate set of credentials.

16. A computer readable storage medium comprising processor executable instructions operable, when executed, to perform the steps of claim 1.

17. A computer, comprising:
a credential repository, the credential repository comprising a collection of electronic addresses corresponding to a plurality of network devices and, for each electronic address, a respective set of credentials previously used at the corresponding electronic address to evidence privileges for a network device associated with the corresponding electronic address;
a candidate credential queue, the candidate credential queue comprising a collection of candidate credentials, each candidate credential having a corresponding at least one of a priority and protocol identifier, the priority indicating a likelihood that the corresponding credential is in current use by the first network device and the protocol identifier indicating a protocol compatible with the corresponding credential, wherein the credentials comprise at least one of a community string, User-Based Security Model (USM) mode, authentication method, authentication password, privacy method, and privacy password;
a credential discovery agent operable to:
select, for valid credential discovery, at least one of a first network device and an electronic address of the first network device from among the plurality of network devices;
contact the first network device;
access, from the credential repository, a first set of credentials corresponding to a first electronic address of the first network device;
test the validity of each member of the first set of credentials in the credential repository with the first network device;
when no credential in the first set of credentials is valid for use with the first network device, test the validity of selected credentials in the candidate credential queue with the first network device; and
when a credentials is valid for use with the first network device, recording the credential as being valid for the first network device.

18. The computer of claim 17, wherein the at least one of a priority and protocol identifier is priority value.

19. The computer of claim 17, wherein the priority value is based on at least one of the following: a candidate credential frequency counter indicating a number of instances of use, by the plurality of network devices and over a selected time period, of a respective credential, a recency of valid use of the respective credential by the plurality of network devices, and a proximity, relative to the first network device, of an administrative locality of at least one of a network device and electronic address found to have validly used the respective credential to the first network device.

20. The computer of claim 19, wherein the priority value is a function of a plurality of the candidate credential frequency counter, the recency of valid use of the respective credential and the proximity, relative to the first network device.

21. The computer of claim 19, wherein the priority value is a function of the candidate credential frequency counter, the recency of valid use of the respective credential and the proximity, relative to the first network device.

22. The computer of claim 17, wherein the credential repository comprises for at least one credential a plurality of a credential state, a protocol identifier indicating a protocol for which the respective credential is compatible, a protocol access level, a total number of instances of use of the respective credential by the plurality of network devices, a priority of use among the plurality of network devices of the respective credential, a candidate credential frequency counter to reflect a frequency of use of the credential among the plurality of network devices, a recency of use among the plurality of network devices of the respective credential, an administrative locality of the respective credential.

23. The computer of claim 17, wherein the selected credentials are tested in an order based on priority value.

24. The computer of claim 17, wherein the credential discovery agent, when a credentials is valid for use with the first network device, records the credentials as being valid for the first network device.

25. The computer of claim 19, wherein the priority value is based on the candidate credential frequency counter.

26. The computer of claim 19, wherein the priority value is based on the recency of valid use of the respective credential.

27. The computer of claim 19, wherein the priority value is based on the proximity, relative to the first network device, of an administrative locality of at least one of a network device and electronic address found to have validly used the respective credential to the first network device.

28. The computer of claim 17, wherein, when at least one credential is valid for use with the first network device, the credential discovery agent adds the valid credential to the candidate credential queue.

29. The computer of claim 17, wherein, when at least one credential is not valid, the credential discovery agent is adapted to:
  ping the first network device to determine whether the first network device is contactable;
  when a response is received, remove the credential from the respective set of credentials in the credential repository corresponding to the at least one of the first network device and first electronic address; and
  when a response is not received, assign a state of NOT CONTACTABLE to a corresponding entry in the credential repository.

30. The computer of claim 17, wherein the at least one of a priority and protocol identifier is protocol identifier.

31. The computer of claim 30, wherein the credential discovery agent is adapted to:
  compare a protocol associated with the first network device with a protocol identifier associated with a first credential in the selected set of credentials in the candidate credential queue; and
  when the protocol associated with the first network device is determined to be the same as the protocol associated with the protocol identifier, test the selected credential for use with the first network device.

32. The computer of claim 17, wherein, when the selected set of credentials in the candidate credential queue is not valid for use with the first network device, the credential discovery agent is adapted to:
  prompt a user for a candidate set of credentials; and, when the candidate set of credentials is received from the user, the credential discovery agent is adapted to test the validity of the candidate set of credentials.

33. A system for analyzing a validity of credentials, comprising:
  a credential discovery agent configured to assign a rank to a selected set of candidate credentials based on whether or not the selected set of candidate credentials is valid, the rank being used to indicate a likelihood that the corresponding selected set of candidate credentials is valid for use with network devices; and
  a credential repository, the credential repository comprising a plurality of sets of candidate credentials for use with network devices and wherein the sets of candidate credentials comprise credentials other than a user name that are known to have been previously used at the network devices to evidence privileges for the network devices, the credential repository further comprising:
    (i) a protocol identifier identifying, from among a plurality of protocols, a particular protocol associated with a corresponding set of candidate credentials, wherein the repository includes a first protocol identifier identifying a first protocol and a second protocol identifier identifying a second protocol, the first and second protocols being different from one another; and
    (ii) a recency of use indicator indicating a recency of use, among multiple network devices in the network, of the set of candidate credentials in the network, wherein the rankings are a function of magnitudes of the use counters, frequency counters, and recency of use indicators and wherein the credential discovery agent is further configured to select a set of candidate credentials from a candidate credential queue, test the validity of the selected set of candidate credentials, and assign the ranking to the selected set of candidate credentials based on whether or not the at least one credential is valid.

34. The system of claim 33, wherein the credential repository further comprises at least one of the following:
  (iii) a use counter indicating a total number of instances of use, by multiple network devices in the network, of a corresponding set of candidate credentials; and
  (iv) a candidate credential frequency counter associated with use, by multiple network devices in the network, of a selected set of candidate credentials.

35. The system of claim 33, wherein the credential repository comprises (iii).

36. The system of claim 33, wherein the credential repository comprises (iv).

37. A method for determining one or more credentials of a network device, comprising:
  selecting a first network device from among a plurality of network devices;
  accessing a candidate credential queue, the candidate credential queue comprising a collection of candidate credentials, each candidate credential having a corresponding protocol identifier, the protocol identifier indicating a protocol compatible with the corresponding credential, wherein the credentials comprise at least one of a community string, User-Based Security Model (USM)

mode, authentication method, authentication password, privacy method, and privacy password;

contacting the first network device;

accessing a credential repository, the credential repository comprising a collection of electronic addresses corresponding to the network devices and, for each electronic address, a respective set of credentials previously used at the corresponding electronic address;

accessing, from the credential repository, a first set of credentials corresponding to a first electronic address of the first network device;

determining that a first protocol is currently used by the first network device;

selecting a first credential and not a second credential from the candidate credential queue, the first credential having a first protocol identifier associated with the first protocol and the second credential having a second protocol identifier associated with a second protocol, the first and second protocols being different;

testing the validity of the first but not the second credential with the first network device;

testing the validity of each member of the first set of credentials in the credential repository with the first network device;

when no credential in the first set of credentials is valid with the first network device, testing the validity of the first credential from the candidate credential queue; and when a credentials is valid for use with the first network device, recording the credential as being valid for the first network device.

38. A computer readable storage medium comprising processor executable instructions operable, when executed, to perform the steps of claim 37.

* * * * *